(12) United States Patent
Mischler

(10) Patent No.: US 7,853,074 B2
(45) Date of Patent: Dec. 14, 2010

(54) MULTI-COLOR DROPOUT FOR SCANNED DOCUMENT

(75) Inventor: Gregory S. Mischler, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 962 days.

(21) Appl. No.: 11/678,688

(22) Filed: Feb. 26, 2007

(65) Prior Publication Data

US 2008/0205751 A1     Aug. 28, 2008

(51) Int. Cl.
*G06K 9/00* (2006.01)

(52) U.S. Cl. .................. 382/163; 235/454; 235/456; 382/317; 715/234

(58) Field of Classification Search .......... 382/162, 382/163, 317; 235/454, 456; 715/234
See application file for complete search history.

(56) References Cited

U.S. PATENT DOCUMENTS

| | | |
|---|---|---|
| RE29,104 E | 1/1977 | Shepard |
| 5,014,328 A | 5/1991 | Rudak |
| 5,014,329 A | 5/1991 | Rudak |
| 5,335,292 A | 8/1994 | Lovelady et al. |
| 6,148,102 A | 11/2000 | Stolin |
| 6,204,935 B1* | 3/2001 | Soma et al. .......... 358/448 |
| 6,263,122 B1* | 7/2001 | Simske et al. .......... 382/311 |
| 7,085,413 B2 | 8/2006 | Huang et al. |
| 7,583,838 B2* | 9/2009 | Lee .......... 382/167 |
| 2002/0164071 A1* | 11/2002 | Mishima .......... 382/162 |
| 2008/0069425 A1* | 3/2008 | Liu et al. .......... 382/137 |

FOREIGN PATENT DOCUMENTS

| | | |
|---|---|---|
| EP | 1574987 | 9/2005 |
| JP | 2003-216894 | 7/2003 |

* cited by examiner

*Primary Examiner*—Vikkram Bali
*Assistant Examiner*—Eueng-Nan Yeh
(74) *Attorney, Agent, or Firm*—Nelson Adrian Bush

(57) ABSTRACT

A method for removing unwanted form color content from a scanned document by segmenting the image into two or more tiles (14). Each tile (14) is classified into at least a first and second set according to its combination of background and color content. A background color is identified from the first set of tiles (14). At least one form color is identified from the second set of tiles. A transform is applied that shifts form color image data values toward background color data values.

10 Claims, 8 Drawing Sheets

MULTI-COLOR DROPOUT FOR SCANNED DOCUMENT

FIELD OF THE INVENTION

This invention generally relates to image processing for scanned document images and more particularly relates to a method for identifying and removing color content from the image.

BACKGROUND OF THE INVENTION

In production scanning environments, a scanned document may have color content that is not pertinent to the data that is needed from the document. For example, pre-printed applications, tax forms, and other documents can contain form color areas, including printed instructions, lines, boxes, or symbols that guide the user of the document to fields that require human entry, where the entered information is typically in pencil or dark ink. Many types of pre-printed forms use pre-printed location markings for character entry, thus confining entered characters or other markings to specific locations and sizes. The use of such location markings then facilitates optical character recognition (OCR) scanning that automates reading of character content entered by the person who completed the form.

For the purpose of clear description, the present application uses the term "form color" to identify color content that can be ignored and "dropped" from the scanned image data for a scanned form or other document. The form color is non-neutral, so that the red (R), green (G), and blue (B) data values corresponding to a form color differ from each other. The data of interest on a scanned form or other document is dark neutral data, termed "neutral data" in this application. Neutral data represents any user-entered text markings, such as those that might have been made on a form in pen or pencil, or printed data that is entered into a form or document. In many applications, neutral data that is scanned from a form or other document is further processed using optical character recognition (OCR) or other utilities. The term "background color" has its conventional meaning as the term is used in the document scanning arts. That is, a background color is generally the color of the medium upon which text or form content is entered or printed. Typically a neutral color, such as white or off-white in most cases, background color could also be a non-neutral color, such as where a document is printed on a colored paper or other colored medium. In bitonal scanning, for example, the background color is preferably shifted to a white or very light grey color, to heighten the contrast between the background and text or form color content.

In order to store and process such scanned documents more efficiently, it is useful to remove unwanted form color from scanned document image data. Conventionally, this has been done in a number of ways. A number of approaches for scanning pre-printed documents such as forms use information known beforehand about the spectral content of the pre-printed documents themselves and use scanning hardware that is suitably adapted to eliminate this spectral content. For example, Reissue Patent RE29,104 (Shepard) utilizes a laser scanner unit adapted to scan a document, wherein the wavelength of the laser is matched to the color of the markings on the documents, so that the light reflected from the markings has the same intensity as the light reflected from the document background. The pre-printed character location markings are thus "blinded" and do not interfere with the reading of the characters. In other approaches, various types of optical filters have been employed, again, with foreknowledge of colors expected on the pre-printed form.

Other approaches for separating the neutral data of interest from the form color operate on the color data itself. For example, U.S. Pat. No. 5,335,292 (Lovelady et al.) describes a remapping of color data to the background, effectively "blinding" an OCR system to unwanted colors on the document, again wherein the colors are known beforehand. Training can also be used, so that a scanning system "learns" how to process a set of documents. However, training has a number of pitfalls. For example, a separate training operation and utility are required for training. Training applications are restrictive as to color and, in many cases, generally work well only when the scanned document has a high level of content in one of the red, green, or blue color channels. Training is not only time-consuming, but also requires that a properly trained operator be on-hand to review and verify results.

Solutions such as those described can be used to remove form color content in situations where the unwanted form color or colors are known beforehand. However, these solutions constrain color dropout for any scanning system so that it can only be used with a specific set of documents. With hardware solutions such as color filters or use of scanning light having a certain wavelength, the scanning optics are matched to the document, so that color dropout is available only for documents having that specific color. Image processing solutions that check for certain form colors are similarly limited, although such systems can be more easily "retrained" or re-programmed to identify and remove other colors. Nevertheless, solutions looking for a specific form color or set of colors do not provide a flexible solution that can be used with a broad range of documents having color content. This can have a negative impact on workflow, for example, since it requires manual sorting of documents with different form colors so that they are directed to different scanning systems. Other, more subtle problems include differences between ink batches and print runs, causing shifts in spectral content for documents that are of the same type, but were printed at different times or locations.

In an attempt to provide a more flexible color detection and dropout scheme, U.S. Pat. No. 7,085,413 (Huang et al.) describes the use of a color histogram obtained from the scanned document, wherein a dominant color can be identified and removed if it exceeds a threshold luminance. This type of approach is at least more dynamic than approaches described earlier that required prior knowledge of the unwanted color or colors. However, the approach described in the '413 Huang et al. disclosure and similar approaches that simply remove entire color channels in order to remove unwanted form colors risk discarding desired information from the scanned data and offer limited performance, particularly where differences between form colors and color content may vary widely. Such solutions may be acceptable where documents have a substantial amount of color content, at least half by area of a single color, for example, or where a document is provided on a colored paper stock. However, such an approach is not well suited for scanning documents that may have some small amount of color content or may have multiple colors.

Ideally, a color dropout scheme preserves grayscale neutral data content in a document, such as pencil marks or pen marks or entered dark text content such as from a printer, so that this content can be stored or used for further processing, such as for OCR processing or mark-sense applications. An acceptable color dropout scheme would discard unwanted form color, dropping color pixels of one or more form colors into the document background, without compromising the quality of the neutral data. Moreover, it would be highly advantageous for a scanning system to have a color dropout method that automatically adapts to paper stocks having different background colors, that identifies the form color content independently on each scanned document, and that takes the necessary steps to remove form color while preserving the desired information that is provided as neutral data.

SUMMARY OF THE INVENTION

It is an object of the present invention to provide a method of document scanning that removes form color without appreciable loss of neutral color data. With this object in mind, the present invention provides a method for removing unwanted form color content from scanned image data for a document, the method comprising:

a) obtaining the scanned document image data in a color data format;

b) segmenting the image data into two or more tiles;

c) classifying each tile into at least first and second sets according to its combination of background and color content;

d) identifying a background color from the first set of tiles;

e) identifying at least one form color from the second set of tiles; and f) applying a transform that shifts form color image data values toward background color values.

From another aspect, the present invention provides a method for removing unwanted form color content from scanned image data for a document, the method comprising:

a) obtaining the scanned document image data in a color data format;

b) segmenting the image data into two or more tiles;

c) characterizing each tile by its color content with the steps of:
  (i) generating a red histogram for red color values within the tile;
  (ii) generating a green histogram for green color values within the tile;
  (iii) generating a blue histogram for blue color values within the tile;
  (iv) determining, according to the red, green, and blue histogram distributions, whether the tile contains predominantly neutral background content, or predominantly form color content, or a combination of background and color content;

d) identifying a background color according to tiles having predominantly neutral background content;

e) identifying at least one form color according to tiles having predominantly form color content; and f) selectively transforming pixels having the at least one form color toward the background color.

It is a feature of the present invention that it analyzes the color content of each scanned document individually, then determines which color or colors are form color content for removal.

It is an advantage of the present invention that it does not require prior knowledge of form colors or training, but applies color processing tools dynamically, to identify form color content and transform this content to the background.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The method of the present invention can remove all form color or colors from the scanned image data, leaving only neutral colors in the resultant grayscale image. That is, using the method of the present invention, one or more form colors can be shifted substantially toward the background color of the document, that is, to the page color, which is typically white or a very light neutral. This form color transformation is accomplished with minimal affect on the neutral data that contains the information content for which the document has been scanned. Unlike conventional solutions, no prior "training" of the scanner system or foreknowledge of the form or background color(s) is needed. As a result of this method, the unwanted form color is dropped into the background while, at the same time, the desired neutral data is preserved. Following this processing, the document data can then be used for optical character recognition (OCR) logic processing, mark-sense detection processing, or other processing that obtains "neutral data" from the document, more precisely, data from the neutral color portions of the document.

To accomplish this, the method of the present invention typically works with a reduced resolution or sub-sampled image, simply to reduce the amount of image data that must be processed and reduce the amount of time required. The method first performs an RGB histogram-based analysis on a reduced resolution or sub-sampled image to sort through the scanned image data for determining background and form color content. Next, hue (H), saturation (S), and value (V) transformation is performed and the resulting HSV data is analyzed to identify the most common background and form colors. A coefficient algorithm is then developed and applied to each pixel, resulting in little or no change to neutral data and background pixels and transforming form color pixels toward the background.

Figure 1:
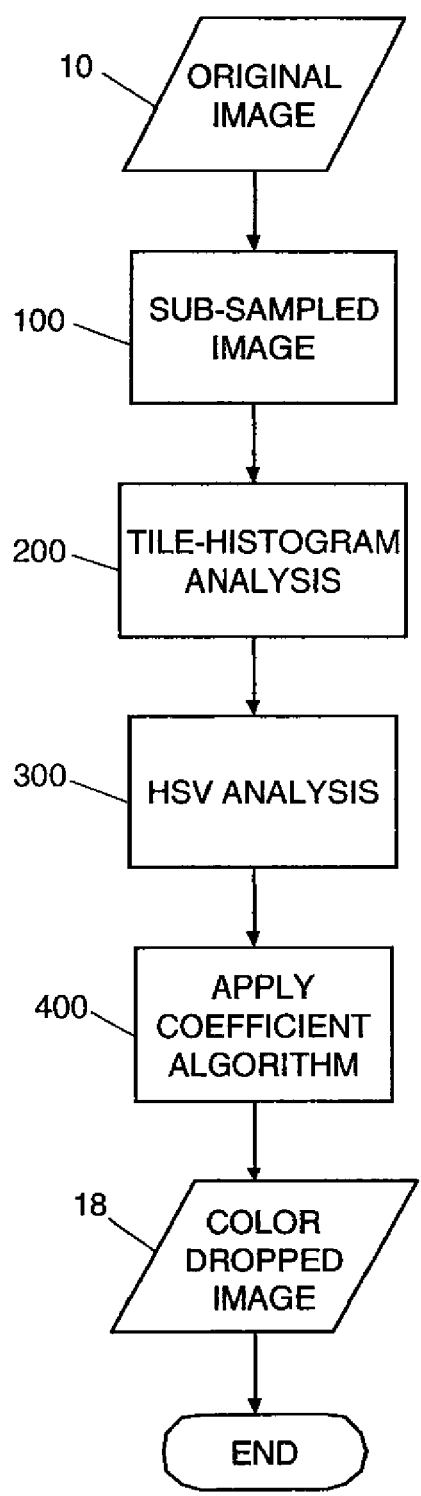
FIG. 1 is a logic flow diagram showing the basic steps of a color dropout method.
Figure 1:
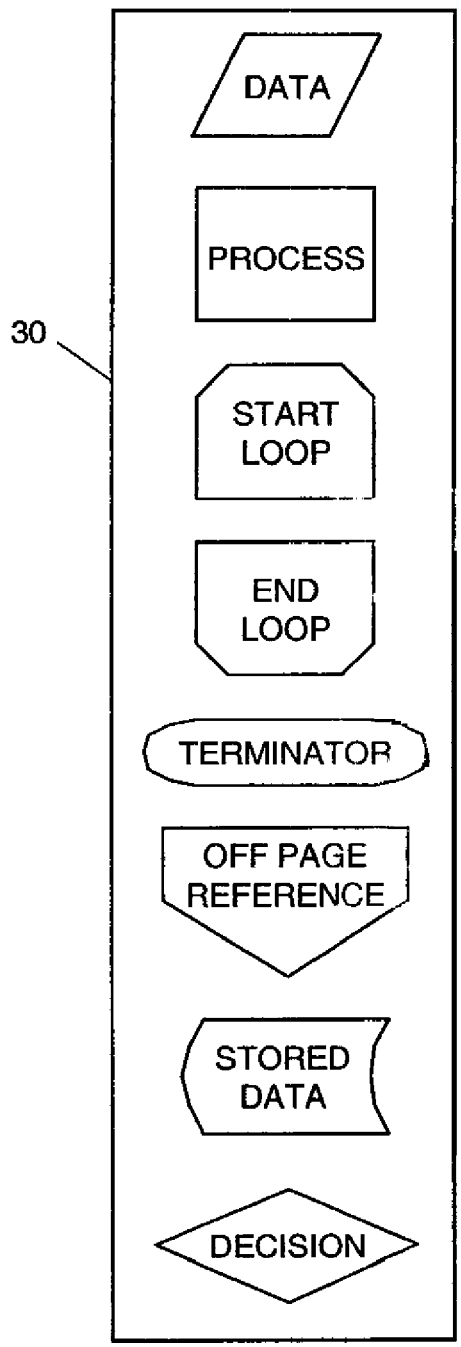

The logic flow diagram of FIG. 1 shows basic steps of a color dropout method. More detailed description of these steps is then given in subsequent sections of this application. A legend 30 is provided as a key to symbols used in this and following logic flow diagrams in FIGS. 2, 3A, 3B, and 6.

Initially, an original image 10 is provided as image data. The first several key steps help to identify the color content of the document. As the first of these steps, an optional sub-sampling step 100 or similar step to reduce resolution of the image is executed on the image data of original image 10. Sub-sampling or other resolution reduction, such as a method using bilinear interpolation or bicubic interpolation, is helpful for decreasing computation time, since it reduces the size of the image data that needs to be processed for the color analysis that follows. It must be noted that this sub-sampling or other resolution reduction is done only for color analysis procedures. Once the form colors to be dropped to the background have been identified, using the initial steps defined here, the full original image 10 (not a sub-sampled portion of this image) is processed to remove color in a subsequent step.

A tile histogram analysis step 200 is executed next, in which the image is segmented into multiple tiles and each tile used to generate red (R), green (G), and blue (B) histograms. Tile histogram analysis step 200 is used to sort through the various segments of the image to identify areas containing color and other content. Next, a portion of the image segments obtained from tile histogram analysis step 200 are then converted to HSV data and processed in an HSV analysis step 300. In this process, an analysis of these hue, saturation, and value parameters is done to find the most common background and foreground colors for these tiles.

Using repeated iterations of the logic used in the present invention, a number of non-neutral colors can be handled as dropout colors. Once these colors are determined, a set of coefficients is calculated for each color and applied in a coefficient application step 400. This part of the process can optionally allow a measure of operator control over dropout color identification. As a result of this processing, a color dropped image 18 is provided.

It is instructive to note that the process described with reference to FIG. 1 applies for the simplest case, that is, removal of a single color. Appropriate parts of the same processing are also carried out iteratively where multiple colors must be dropped, as described subsequently.

Figure 2:
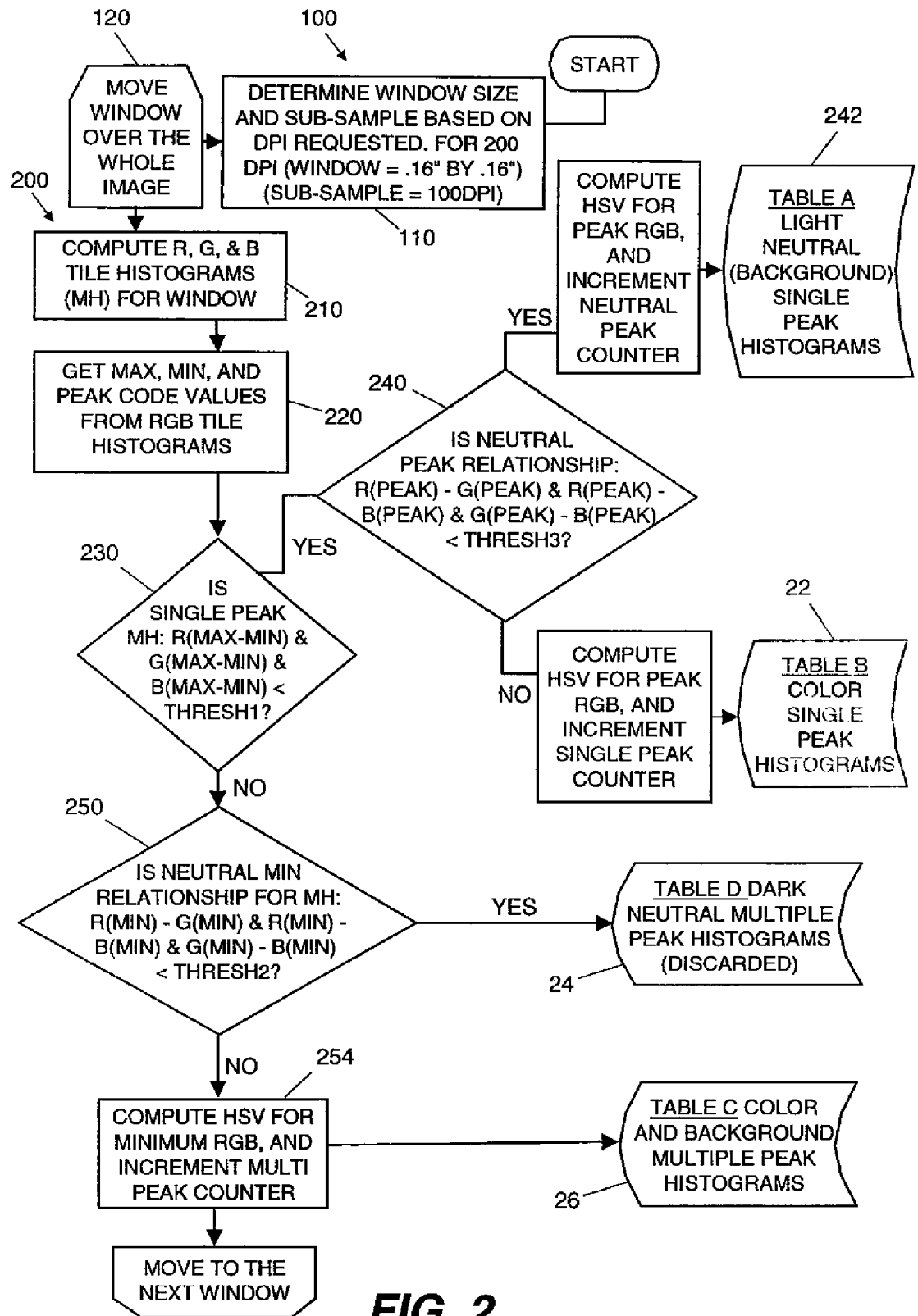
FIG. 2 is a logic flow diagram showing the sequence of procedures used in sub-sampling and tile histogram analysis.
Figure 7:
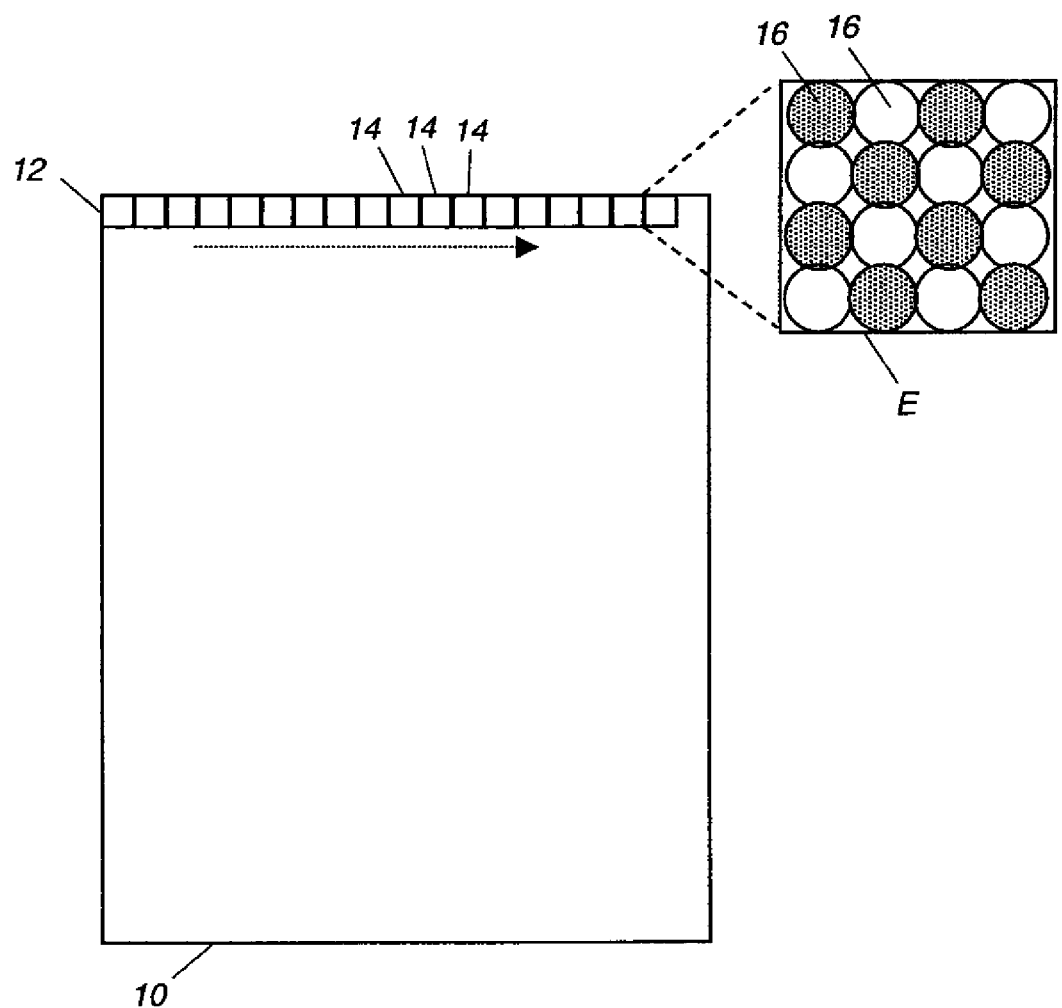
FIG. 7 is a plan view showing tile utilization and sub-sampling.

The logic flow diagram of FIG. 2 shows the sequence of procedures used in sub-sampling step 100 and tile histogram analysis step 200. FIG. 7 shows a plan view of original image 10 as it undergoes this processing (not to scale). For this step, original image 10 is subsampled or otherwise reduced in resolution and scanned using a segment or tile 14 of a specified size, organized in rows 12. The arrangement of tiles 14 in successive rows provides coverage for the full image. Tiles 14 are preferably non-overlapping, so that every pixel 16 appears within one and only one tile 14.

Within each tile 14 are a number of pixels 16, as shown in an enlarged window E of FIG. 7. Some number of pixels 16 are sub-sampled for the color analysis that follows. In the simple example of FIG. 7, the sub-sampling selects every other pixel to provide a reduced-resolution image. As noted earlier, this sub-sampling is optional and is only done to reduce the volume of data that must be processed in order to identify a dropout color. Empirical results have shown that sub-sampling to about 100 dpi (dots per inch) is acceptable for determining dropout colors for most documents. Depending on the document complexity and on the needed accuracy, a dpi value that is lower, such as 50-70 dpi, may not perform as well as this analysis for an image of 100 dpi or greater. In one embodiment, tile 14 dimensions are approximately 0.16 inches square. Non-square tile shapes could alternately be used.

Referring back to the flow diagram of FIG. 2, a tile setup step 110 establishes the size of tile 14 to be used for a scanning step 120 in which each tile 14 is obtained, moving across the image. Color characterization is then performed on each tile 14. The use of a small tile 14 is advantaged for color analysis over conventional methods that characterize color over the full image. The use of multiple small tiles 14 facilitates the detection of multiple colors that are distinguishable from one another. The characterization of each tile 14 in tile histogram analysis step 200, then prepares the image data for further color analysis, as described subsequently.

Tile Histogram Analysis

In a histogram generation step 210, red (R), green (G), and blue (B) histograms are generated for each tile 14. Because data at the edges of the document image may be partial, such as where the last tile 14 in row 12 extends beyond the edge of the document page, the corresponding data may be discarded from the set of tile histogram content that will be further analyzed.

For each red, green, and blue histogram that is generated, the following data is obtained in an obtain values step 220:
(i) minimum code value (CV);
(ii) maximum code value (CV);
(iii) peak or most common CV.

A single-peak decision step 230 follows, in which the relative distribution of code values (CV) in each histogram is assessed. In step 230, it is desirable to determine whether any individual histogram exhibits a single peak or more than one peak. Each of the color channels must exhibit a single peak in order for a tile to contain a single color or neutral. Having more than just one peak indicates the likelihood that there are multiple colors within the corresponding tile 14. For this assessment, an empirically determined threshold value (Thresh1 in FIG. 2) is used. If the difference between maximum and minimum CVs exceed this threshold, a multi-peak (that is, a likely multicolor) condition is sensed.

Where a single peak condition is sensed, a neutral color test 240 is next performed. In this logic, peak values for red, green, and blue are compared. For neutral colors, the R, G, and B values will be approximately the same, within some small range of variability. As long as the difference between these values is below an empirically determined threshold (Thresh3 in FIG. 2), the tile is assumed to have a neutral or background color. Where this is the case, a transformation step 242 tracks neutral peaks and converts the RGB data value for the peak data value to an HSV data value. This color information is then stored as light neutral or background data in a Table A, indicated at 20 in FIG. 2.

If step 240 determines that the difference between peak values for red, green, and blue exceeds the threshold, the tile indicates a color that has high likelihood of being a candidate for color dropout. A transformation step 244 tracks color peaks and converts the RGB data value the peak data value to an HSV data value. This color information is then stored as single-peak color data in a Table B, indicated at 22 in FIG. 2.

Where a multi-peak condition is sensed, a dark neutral decision step 250 is performed. Here, the difference between minimum R, G, and B values is calculated and compared to an empirically determined threshold value (Thresh2 in FIG. 2). If less than this threshold value, the histogram indicates a dark neutral with multiple peaks, which is characteristic of image content that is most likely to correspond to the data of interest, such as pencil marks, pen entries, or other neutral text or markings. This relationship, a multi-peak condition with the difference between minimum R, G, and B values less than a threshold, could also indicate multiple colors in the histogram. In either case, although such a tile is most likely to have data content that is of interest for the scanned document, information about such a tile is not of interest for the purpose of dropout color identification. With respect to the logic flow shown in FIG. 2, this data is stored in a Table D, indicated at 24. Again, it is instructive to re-emphasize that this data is considered as "discarded" only for the limited purpose of dropout color identification as outlined in Table D and following. An attempt to use this data for color analysis could lead to ambiguous results in identifying a form color. Leaving this data out of subsequent color calculations simplifies processing and is more likely to yield accurate identification of form colors. Significantly, there is no discarding of the actual image data corresponding to tiles assigned to Table D. Once one or more dropout colors have been identified, this image data is processed for color dropout along with all other image pixels, as described subsequently.

Still referring to step 250 in FIG. 2, where there is a multi-peak condition and the difference between minimum R, G, and B values exceeds the threshold value, the histogram indicates color and background content. A transformation step 254 tracks multi-peak tiles and converts the RGB data value the peak data value to an HSV data value. This is then stored in a Table C, indicated at 26.

Thus, at the conclusion of the processes in tile histogram analysis step 200, the content of each tile 14 has been classified and stored. By way of quick summary, the following assignments have been made for classifying each tile 14:

Table A, where tile 14 contains predominantly a neutral or background color.

Table B, where tile 14 contains a sizeable area of a solid form color.

Table C, where tile 14 contains both form color and background content.

Table D, where tile 14 contains dark neutral content that is most likely to contain the data of interest.

All tiles 14 having content that is clearly other than the Table D dark neutral content that is to be preserved then undergo RGB-to-HSV conversion prior to additional analysis.

Figure 4:
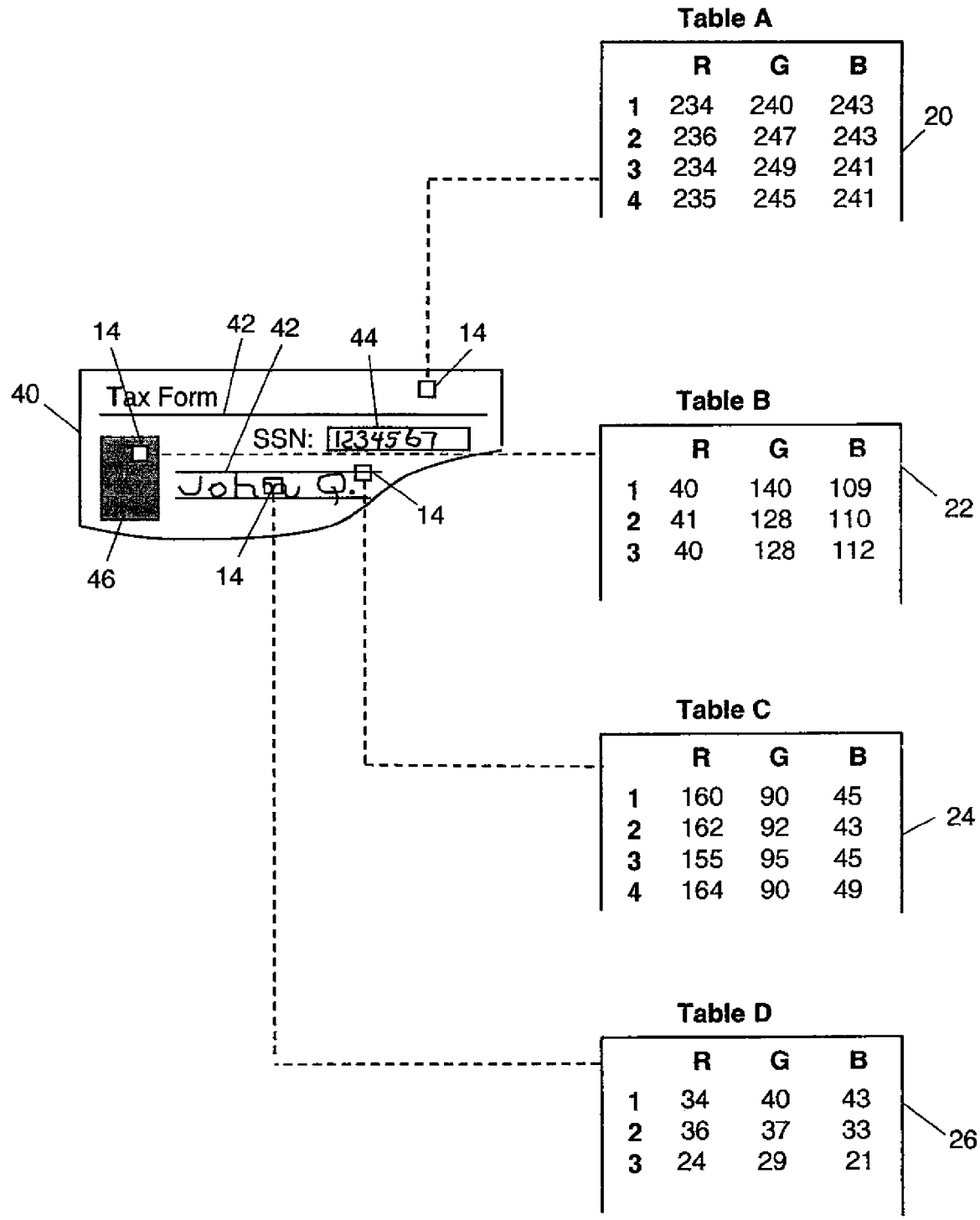
FIG. 4 shows assignment of scanned tiles of the image according to color and background content characteristics, according to one embodiment.

As an example, consider the partial document shown in FIG. 4. Here a document 40 has a white/neutral background with red form color (the intended dropout color) and black text. Document 40 has red lines 42, entered text 44, and a color area 46 and shows a small portion of sample data for representative tiles 14 using the logic flow shown in FIG. 2. In this embodiment, tiles 14 from this document are sorted as follows:

(i) Multi peak histogram data is saved in Table C (color foreground and background). Over a portion of the document that contains white or other light neutral background and colored text or lines, the red, green, and blue tile histograms exhibit more than one peak. The minimum values in the RGB tile histograms represent the darkest color (red in the example of FIG. 4) that is present for that tile 14, data that is stored in Table C.

(ii) Single peak neutral histogram data is saved in Table A (light neutral background). Over a portion of the document that contains only the white, off-white, or other predominantly neutral background, the red, green, and blue tile histograms exhibit only one peak. In such a tile 14, the most common CV for the red, the green, and the blue components will correspond to the white background color, data that is stored for each such tile in Table A.

(iii) Single peak color histogram data is saved in Table B (color background). Over a portion of the document containing large areas of solid dropout color, such as a color area 46 in FIG. 4, (exceeding 0.16″ square in one embodiment), single peak tile histograms may be generated that contain this non-neutral color, with the data for each such tile stored in Table B.

(iv) All other histogram data is saved in Table D (dark neutral foreground and background). Over a portion of the document that contains both white background and black text, the red, green, and blue tile histograms exhibit more than one peak. The minimum values in the RGB tile histograms represent the darkest neutral black text present for that tile, data that is not considered for the purpose of dropout color identification. Color data for such tiles are stored in Table D.

Following this sorting and assignment of each of the tiles 14, the Table B and Table C data are used to determine the best color RGB value to be used in the creation of the coefficient equation for color dropout. If tile 14 is found to have a single peak for the red, green, and blue tile histograms, then the hue, saturation, and value (HSV) parameters are computed from the most common red, green, and blue CVs from those tiles. If tile 14 has multi-peak histograms for the red, green, or blue and a comparison of the minimum values indicate that color is present, the HSV parameters for that tile 14 are computed based on the minimum values for RGB.

Once tile histogram analysis step 200 is complete, the algorithm has the following information: the total number of tiles 14 in the document image, the number of single peak tiles, and the number of non neutral multi-peak tiles 14. Corresponding hue, saturation, and value parameters for each single and multi-peak tile histogram can then be used in subsequent processing.

Hue, Saturation, and Value Analysis

As is well known in the imaging arts, accurate analysis of a color requires looking at three attributes, for example: red, green, blue (RGB) or hue, saturation, and value (HSV) coordinates. Here, the use of HSV values, rather than their corresponding RGB values, has shown to be of particular utility for identifying form colors.

After the sorting and assignment of tiles 14 done with the processing logic of FIG. 2, the next step in finding the dropout colors in the document image is to analyze the results of the tile histogram computation for the data that has been sorted into Tables 20, 22, and 26. This is done by analyzing the hue, saturation, and value parameters that have been computed for each of the corresponding single-peak and multi-peak tile histograms. As described with respect to the processing steps of FIG. 2, RGB values assigned to Tables A, B, and C are transformed into their corresponding hue, saturation, and value (HSV) coordinates.

The hue, saturation, and value (HSV) parameters are computed for the most common red, green, and blue code values (CV), from each single peak tile histogram, as was described with reference to FIG. 2. An analysis of these hue, saturation, and value parameters is then done to find the most common background and foreground colors. By looping through the HSV analysis procedure, a number of non-neutral colors can be found as dropout colors.

Figure 3A:
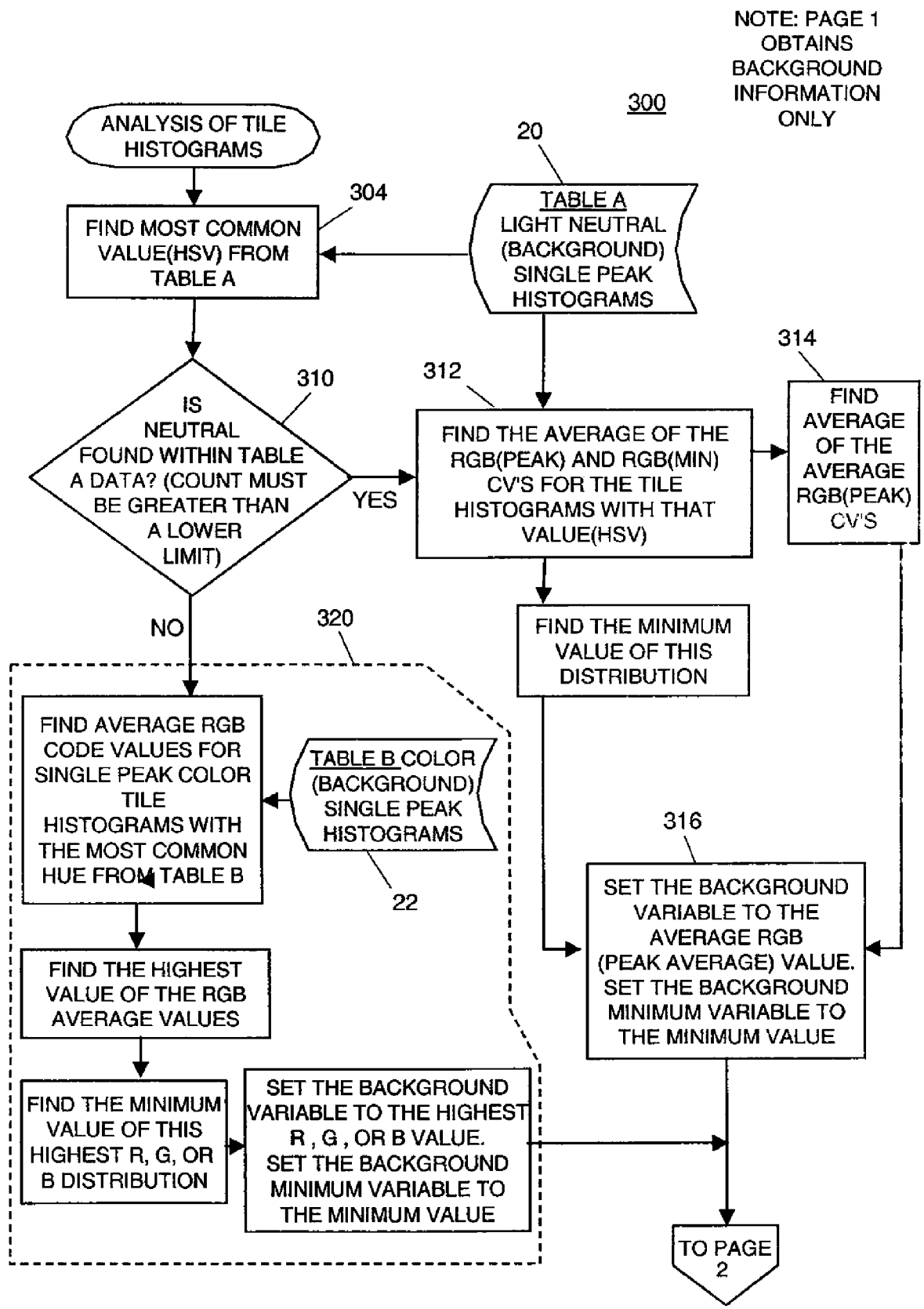
FIGS. 3A and 3B shows the sequence of steps used in data conversion and analysis in one embodiment.
Figure 3B:
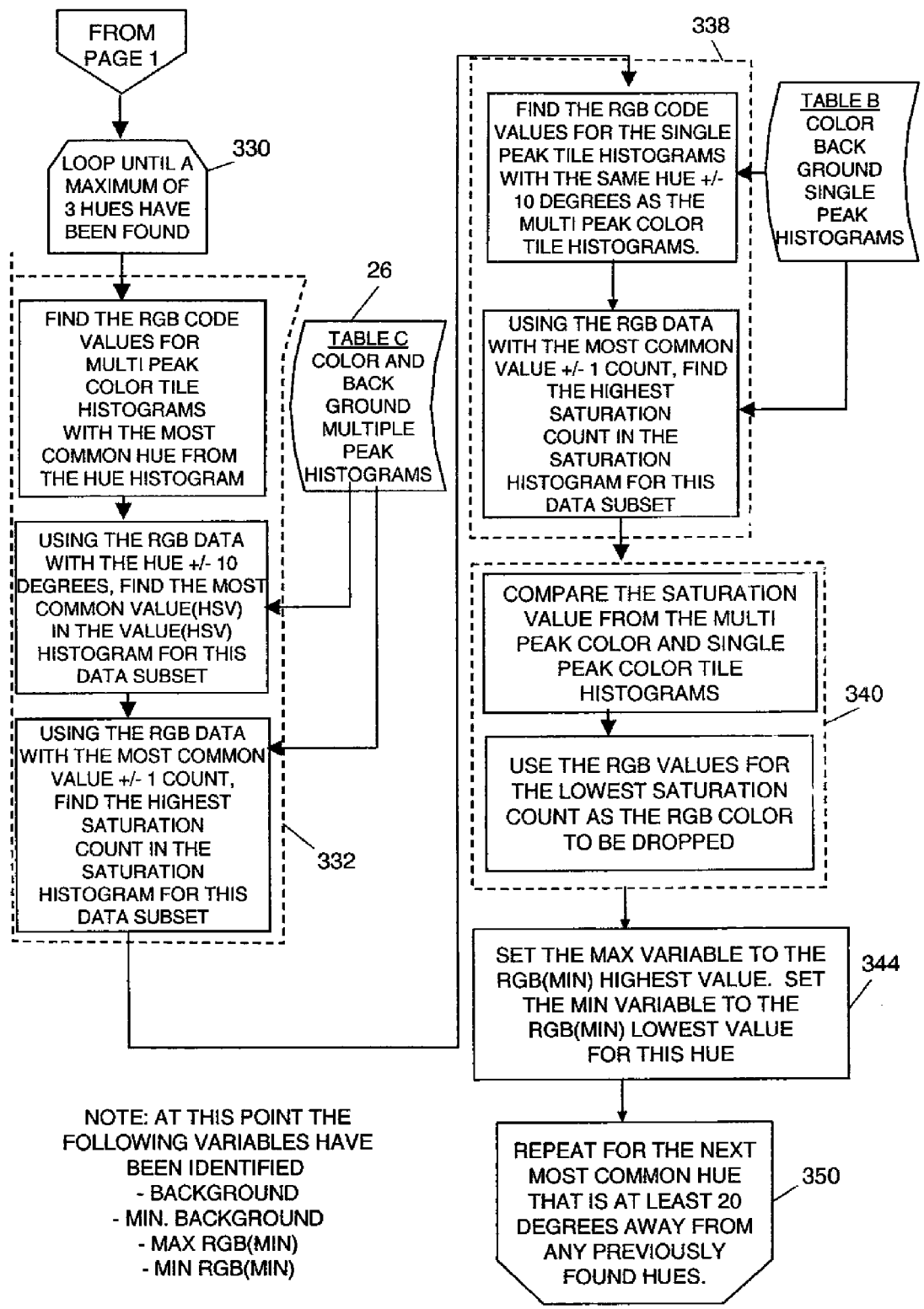

The logic flow diagrams of FIGS. 3A and 3B give the detailed procedures that are followed in HSV analysis step 300. The first sequence of steps begins with the tile data listed in Table A. As noted earlier and shown in the example of FIG. 4, Table A contains entries for tiles 14 having only light neutral background content.

The first step of the analysis is to find the most common neutral background color if one exists in a significant amount. This helps to eliminate neutral colors that are not the background color and is done by finding the most common value (HSV) from the histogram data described above (Table A). Table A values obtained from tile histogram analysis step 200 in FIG. 2 are first averaged in a common value determination step 304. Step 304 provides an averaged R, G, and B value for all of the Table A entries. Using the example of FIG. 4, this step essentially averages the values in each of the R, G, and B columns, computing an averaged R value, an averaged G value, and an averaged B value.

A neutral content decision step 310 is then carried out using the Table A values. This step determines whether or not the background content is a color or is neutral. This can be determined in a number of ways. In one embodiment, a threshold value of 50% of the full document, or some other appropriate percentage value, is used. Where the Table A content exceeds this threshold percentage for the document, neutral background color content can be assumed and processing continues with an averaging step 312. Averaging step 312 finds the average peak and minimum RGB values for the tile having this type of content. The minimum value of the distribution and the mean of this average are then computed as part of averaging step 312. Another averaging step 314 is executed to compute the average of the average R, G, and B peak values obtained in common value determination step 304. Then, in a background setting step 316, a background variable is set to the average RGB peak value. The background minimum value is set to the minimum value computed in step 312.

In some cases, a document may be printed on colored paper. Where Table A content indicates a colored, rather than neutral color background, color background steps 320, indicated in FIG. 3A by a dashed outline, are executed. These steps are applied to data from Table B. First, code values for the most common RGB hue are obtained. Then, the highest of the average RGB values is computed and assigned as the background. This average background is used in the calculation of the primary coefficient employed in the color dropout phase, described subsequently. The minimum value of the RGB distribution is also obtained and assigned as a background minimum, used to determine if a pixel is a background pixel. For example, if the highest value channel is determined to be Red, image pixels where the Red channel is higher than the minimum background value are assigned the Red channel value.

Referring next to FIG. 3B, the basic processing loop for identifying background and form colors to be dropped is shown. Following each loop entry 330, a hue identification step 332 is performed, with its basic steps shown within dashed outline. Values from Table C are used as input. A histogram of HSV values is generated, using the Table C data. The first, second, and third most common hues can be identified in successive loop operations. Once the most common hue is found, other hues at angles outside of a given range (+/−10 degrees in the example embodiment of FIG. 3B) are eliminated from consideration. Value (V) and saturation (S) coordinates are then checked for the identified color. The most common V coordinate value is determined and is used to identify the corresponding saturation S coordinate value for the corresponding RGB data entry in Table C.

Figure 5:
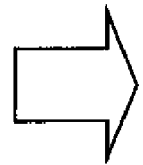
FIG. 5 shows an example conversion of some of the data from RGB to HSV.

For example, referring to FIG. 5, there are shown some typical values such as may list within Table C. These RGB values are converted to HSV values. In the example given (with only 4 values shown in this example for clarity), the most common Hue value is 9 degrees, a red hue. The range of +/−10 degrees then gives a resulting range of H values between 359 degrees and 19 degrees. This eliminates the (252, 370, 180) HSV value for this looping operation, (a bluish hue) since the value 252 degrees is outside of this H value range. The most common value coordinate for the remaining HSV entries is 160. This isolates the saturation counts that can then optionally be used as a check against spurious data. The highest of these saturation values (S=500) corresponds to the second RGB entry, (160, 90, 45).

Referring again to FIG. 3B, a second hue identification step 338 is executed, with its basic steps shown within dashed outline. These steps apply similar processing to that used with the Table C data, using the same hue range established in hue identification step 332 and obtaining a saturation value. A dropped color determination step 340 compares saturation values obtained from the Table C and Table B data and selects the RGB value that corresponds to the lower of the two saturation values as the RGB color to be dropped. The maximum and minimum RGB values corresponding to this color are then obtained in a maximum/minimum determination step 344. For example, for RGB color (160, 90, 45) the maximum value is 160, the minimum value is 45.

A loop-back step 350 then directs processing back to loop entry 330 for subsequent form colors to be dropped. In one embodiment, the loop shown in FIG. 3B is executed three times to identify three dropout colors. The procedures described earlier with reference to FIGS. 3A and 3B detect and profile neutral background and color content in order to provide variables used by the color removal algorithm. Once these colors are determined, a set of coefficients is calculated for each color.

Color Dropping Algorithm

The preceding steps provide variables that are used to generate coefficients that allow rapid processing of the image data and removal of unwanted color material. The use of color dropout coefficients is described, for example, in commonly-assigned U.S. Pat. No. 5,014,328 and in U.S. Pat. No. 5,014,329 (both to Rudak) and both incorporated herein by reference.

For color dropping, a color dropout function for each RGB color is generated. This function has a primary and secondary coefficient. For each pixel in the image, the primary coefficient is multiplied by the Max RGB value, while the secondary coefficient is multiplied by the Min RGB value. These two resultant values are then summed together to produce the grayscale value for that pixel. Since any image can have as many coefficient equations as there are colors, each pixel in the image must be examined to determine which equation should be applied to that pixel.

Each pixel RGB value is first compared with the background minimum value. If R, G, and B values are greater than the background minimum, the pixel grayscale value is set to the pixel RGB(max). This is done to preserve the background variability within the image. If any of the RGB values are less than the background minimum value, a comparison is performed between a given pixel RGB and the three possible RGB values that were used to generate the color drop coefficient equations. The equation for the color drop RGB that is the closest match, as determined by the relative hue of the pixel, will be used to calculate the grayscale value for that pixel. If a closest match is not found, the equation with the lowest primary coefficient number is then used.

The final output of the multi-color dropout algorithm is a grayscale image with the same resolution as the input image.

The output image will retain all neutral pixels near their original grayscale value, with all qualified color pixels driven to a near background value. The more colorful the pixel is, the more likely that the coefficient equation will produce a grayscale value that is close to the background value in the image.

Figure 6:
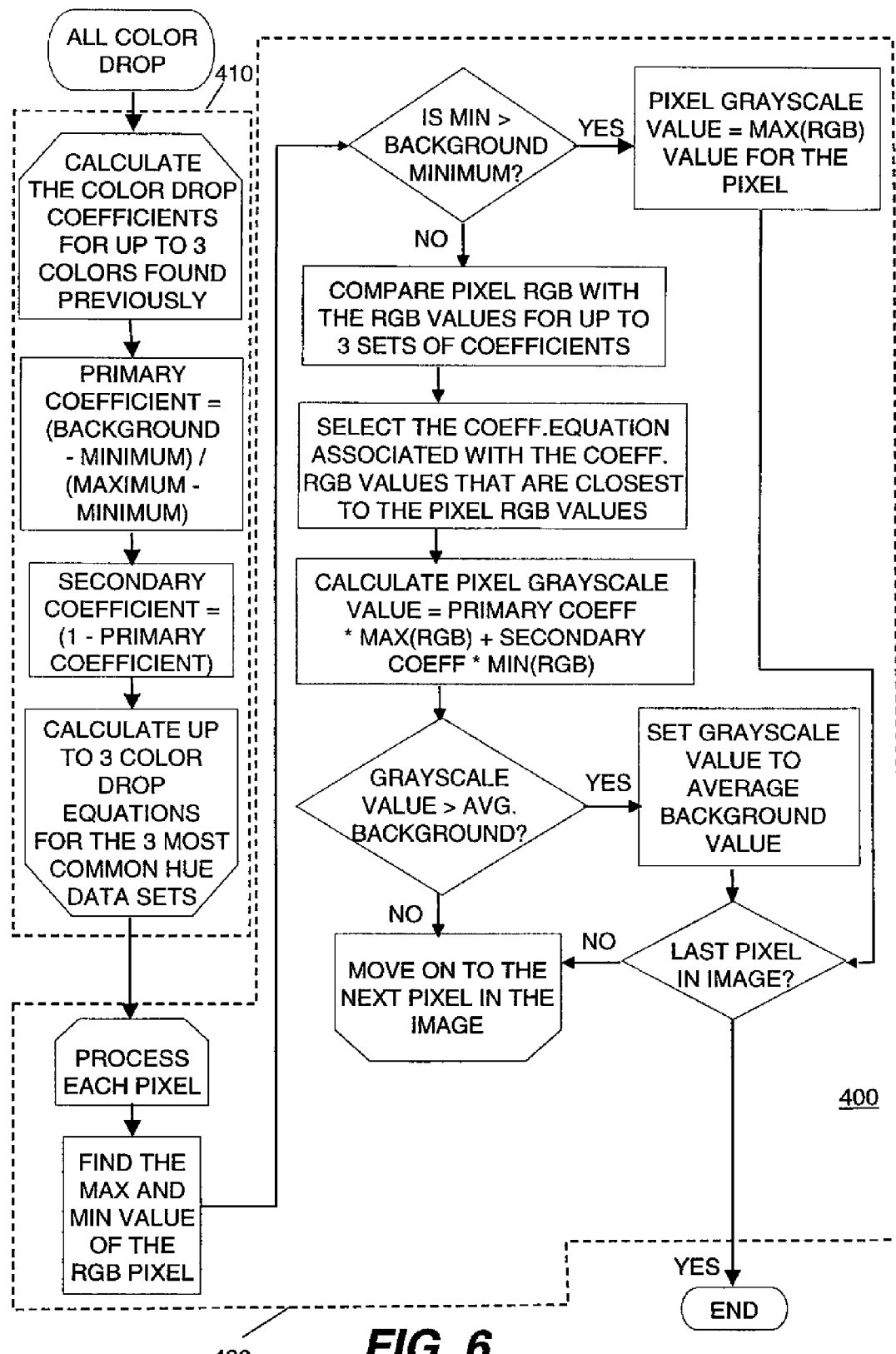
FIG. 6 is a logic flow diagram of coefficient calculation and application.

The logic flow diagram of FIG. 6 shows the multi-color dropout procedure according to one embodiment. A coefficient calculation step 410 has the sequence of procedures shown in dashed outline. In order to be able to perform this procedure dynamically (for example, as the document is being scanned), the three-dimensional color space is considered only with respect to two dimensions. Since the goal of the algorithm is to drop all color except neutral, a two dimensional color space is a viable option. For example, if the most predominant form color is identified in 3-dimensional RGB color space as RGB (200, 100, 50) the coefficient equation would be calculated in 2-dimensional space using the Max. value (200) and the Min. value (50). This equation would be exactly the same for any color represented by RGB (200, 200-50, 50) or (200-50, 200, 50) or (50, 200, 200-50). The goal using this equation is to drive any of these RGB colors to the grayscale background value.

For example, the procedures of coefficient calculation step 410 in FIG. 6 may obtain the following:

Parameters->Max 200,Min 50,Background 235

Primary Coefficient=(BkGrd−Min)/(Max−Min)

(235−50)/(200−50)=1.233

Secondary Coefficient=(1−Primary Coefficient)

1−1.233=−0.233

A pixel processing step 420 is then executed for each pixel, using the coefficients obtained in the preceding coefficient calculation step 410. In this 2-dimensional space, several color planes in 3-dimensional space are moved to the background value by the coefficient equation as demonstrated below:

Coefficient Calculation=(Max*Primary)+ (Min*Secondary)

(200*1.233)+(50*−0.233)=234.95

The Max (200) and Min (50) coefficient equation thus moves several colors to the grayscale background value of 235.

The method of the present invention provides an adaptive color-dropping scheme that is flexible, efficient, and does not require training for each type of document that may be scanned. Significantly, the method of the present invention allows each individual document to be separately scanned, without preloading values or requiring operator entry and without the need for identifying the document type. There is no need to pre-sort documents, so that only certain types of documents go to a particular scanner or so that only certain types of documents or documents having only certain colors are handled in the same batch process. This means, for example, that it is not necessary to restrict scanning to a certain set of document types; the method of the present invention can provide color dropout for different color documents, allowing these documents to be scanned and treated in sequence.

Documents processed using the method of the present invention can then be used subsequently in a number of ways. For example, OCR processing may be performed on the documents following color dropping according to the present invention.

The method of the present invention can be executed by a scanner apparatus or by an image processor that operates on scanned data. Because it affords a fast method for removing one or more unwanted form colors, the method of the present invention can be executed directly on the scanned data, so that scanner data provided to an end-user is already conditioned using form color dropout.

Unlike other methods for selective color dropout, the method of the present invention does not require training of a scanner or image processing device. No pre-sorting of documents is required with the method of the present invention.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, steps of subsampling, tiling, generating histograms, performing RGB-HSV conversion, and testing against outlier conditions can apply a number of different types of procedures familiar to those skilled in image processing. Optional checks for outliers can also be executed during image data processing, as is well known to those skilled in the image processing arts. Color scanning can obtain RGB data or, optionally, can obtain color data in some other data format, such as YCC format, for example. Tiles are preferably non-overlapping, although some amount of overlap, where the same pixel is on the edge of two adjacent tiles, could be permissible. While the coefficient transform has been found to be advantageous for shifting form color to background colors, other transforms can alternately be used that apply the color identification methods of the present invention. Sub-sampling is only one among a number of methods that could be used for reducing the resolution of an image tile. Other suitable methods for reducing resolution include, but would not be limited to, bilinear interpolation or bicubic interpolation, for example.

Thus, what is provided is an apparatus and method for identifying and removing form color content from a scanned image.

PARTS LIST

10 original image
12 row
14 tile
16 pixel
18 color dropped image
20 table
22 table
24 table
26 table
30 legend
40 document
42 red line
44 entered text
46 color area
100 sub-sampling step
110 tile setup step
120 scanning step
200 tiled histogram analysis step
210 histogram generation step
220 obtain values step
230 single-peak decision step
240 neutral color test
242 transformation step
244 transformation step 250 dark neutral decision step
254 transformation step
300 HSV analysis step
304 common value determination step
310 neutral content decision step
312 averaging step
314 averaging step
316 background setting step
320 color background steps
330 loop entry
332 hue identification step
338 hue identification step
340 dropped color determination step
344 maximum/minimum determination step
350 loop-back step
400 coefficient application step
410 coefficient calculation step
420 pixel processing step

The invention claimed is:

1. A method for removing unwanted form color content from scanned image data for a document, the method comprising:
 a) obtaining the scanned document image data in a color data format;
 b) segmenting the image data into two or more tiles;
 c) characterizing each tile by its color content with the steps of:
  (i) generating a red histogram for red color values within the tile;
  (ii) generating a green histogram for green color values within the tile;
  (iii) generating a blue histogram for blue color values within the tile;
  (iv) determining, according to the red, green, and blue histogram distributions, whether the tile contains predominantly neutral background content, or predominantly form color content, or a combination of background and color content;
 d) identifying a background color according to tiles having predominantly neutral background content;
 e) identifying at least one form color according to tiles having predominantly form color content; and
 f) selectively transforming pixels having the at least one form color toward the background color.

2. The method of claim 1 wherein selectively transforming comprises applying coefficients that shift form color values toward background color values.

3. The method of claim 1 wherein identifying the background color comprises:
 a) transforming RGB color data to HSV color data; and
 b) finding the most common hue color data value for pixels having a hue color data value within about +/−10 degrees of the background color.

4. The method of claim 1 wherein determining, according to the red, green, and blue histogram distributions, whether the tile contains predominantly neutral background content, or predominantly form color content, or a combination of background and color content comprises identifying one or more peak values in the red, green, or blue histogram distributions.

5. The method of claim 1 wherein identifying at least one form color comprises converting an RGB coordinate value to an RSV coordinate value.

6. The method of claim 1 wherein characterizing each tile further comprises reducing the resolution of the image data within the tile.

7. The method of claim 1 wherein the color format is red, green, blue (RGB) format.

8. The method of claim 1 wherein the tiles are substantially non-overlapping.

9. The method of claim 1 wherein the same steps are executed for processing each document in a succession of documents.

10. The method of claim 1 wherein selectively transforming pixels comprises generating transform coefficients based on maximum and minimum RGB data values from the identified form color and applying the transform coefficients to each pixel's maximum and minimum RGB data values.

* * * * *